United States Patent [19]

Kephart et al.

[11] Patent Number: 5,675,711
[45] Date of Patent: Oct. 7, 1997

[54] ADAPTIVE STATISTICAL REGRESSION AND CLASSIFICATION OF DATA STRINGS, WITH APPLICATION TO THE GENERIC DETECTION OF COMPUTER VIRUSES

[75] Inventors: Jeffrey Owen Kephart, Yorktown Heights; Gregory Bret Sorkin, New York; Gerald James Tesauro, Croton-on-Hudson; Steven Richard White, New York, all of N.Y.

[73] Assignee: International Business Machines Corporation, Armonk, N.Y.

[21] Appl. No.: 242,757

[22] Filed: May 13, 1994

[51] Int. Cl.$^6$ .............................. G06E 1/00; G06F 15/18
[52] U.S. Cl. .................. 395/22; 395/20; 395/21
[58] Field of Search ........................... 395/11, 20–27; 382/155–159; 364/431.02, 551.01

[56] References Cited

U.S. PATENT DOCUMENTS

| | | | |
|---|---|---|---|
| 5,058,180 | 10/1991 | Khan | 382/158 |
| 5,204,938 | 4/1993 | Skapura et al. | 395/27 |
| 5,325,445 | 6/1994 | Herbert | 382/38 |
| 5,359,699 | 10/1994 | Tong et al. | 395/22 |

OTHER PUBLICATIONS

"Al Trends in Virus Control", I. Qasem et al IEEE Proc. of Southeastcon '91 vol. 1 pp. 99–103.
Lippmann, "Pattern classification using neural networks"; IEEE Communications Magazine, pp. 47–64, Nov. 1989.
Elliman, "a net with feedback for recognizing deformed patterns"; IEEE 1989 colloquim. No. 083: Current issues in neural network research, pp. 3/1–3/5, 1989.
Li, "invariant object recognition based on a neural network of cascaded RCE nets"; Neural Networks, 1990 IEEE International Conference, pp. 845–854 vol. II, 1990.

*Primary Examiner*—Tariq R. Hafiz
*Attorney, Agent, or Firm*—Robert P. Tassinari, Jr.

[57] ABSTRACT

A data string is a sequence of atomic units of data that represent information. In the context of computer data, examples of data strings include executable programs, data files, and boot records consisting of sequences of bytes, or text files consisting of sequences of bytes or characters. The invention solves the problem of automatically constructing a classifier of data strings, i.e., constructing a classifier which, given a string, determines which of two or more class labels should be assigned to it. From a set of (string, class-label) pairs, this invention provides an automated technique for extracting features of data strings that are relevant to the classification decision, and an automated technique for developing a classifier which uses those features to classify correctly the data strings in the original examples and, with high accuracy, classify correctly novel data strings not contained in the example set. The classifier is developed using "adaptive" or "learning" techniques from the domain of statistical regression and classification, such as, e.g., multi-layer neural networks. As an example, the technique can be applied to the task of distinguishing files or boot records that are infected by computer viruses from files or boot records that are not infected.

15 Claims, 5 Drawing Sheets

5,675,711

ADAPTIVE STATISTICAL REGRESSION AND CLASSIFICATION OF DATA STRINGS, WITH APPLICATION TO THE GENERIC DETECTION OF COMPUTER VIRUSES

FIELD OF THE INVENTION

The present invention relates to the classification of data strings, and in particular to an adaptive statistical regression and classification method for the generic detection of computer viruses.

BACKGROUND OF THE INVENTION

One of the most common techniques for detecting a computer virus in a given program is to scan the machine-level representation of that program (i.e., representation by bytes) for patterns that are present in a set of known viruses, and unlikely to be found in normal, uninfected programs. Typically, when a new virus appears, a human expert analyzes it, and selects a pattern of bytes in the virus that is deemed to be unlikely to occur by chance in uninfected programs. (This pattern is referred to as a "signature" for the virus.) The new signature must then be distributed to the customers that use that anti-virus software. It can take several months before a substantial fraction of the customers receive the update. Thus, anti-virus software that relies on particular knowledge of specific viruses can lag substantially behind the discovery of a new virus.

One solution to this problem is to construct a generic virus detector that flags programs that contain features that are deemed to be virus-like. The generic classification of a program as containing a virus (or not) is bound to be somewhat less certain than classification based on signatures for specific known viruses, but if the rate of false positives (the fraction of the time that the program falsely accuses an uninfected program of being infected) is very low, it can be an invaluable tool.

The current state of the art in generic virus detection is for a human expert to identify a number of features that are present, or conceivably could be present, in many viruses. The occurrence frequency of these features in executable data is taken as input to a classifier (also designed by the human expert) that classifies the executable data as "infected" or "not infected". If the executable data is classified as "infected", the classifier may attempt to make finer distinctions, placing the putative virus into one of a number of generic virus families.

The method of constructing a generic virus detector purely through the use of human expertise is deficient for at least two reasons. First, the number of different viruses in existence (in fact, just those that operate in a DOS environment) numbers in the thousands—making it extremely difficult for humans to develop a full list of characteristic viral features. Second, given a large number of features taken from a large number of viruses, it is very difficult for a human to construct a classifier that combines these features into an optimal decision as to whether a particular file contains a virus. Thus, there is presently a need for an automated method for constructing a generic virus detector that would either supplement or supplant human expertise. Heretofore, however, the development of such an automatic method has generally been thought to be either very difficult or impossible.

The field of generic virus detection is just one of many contexts in which it is desirable to construct automatically a classifier capable of distinguishing among two or more classes of data strings. Another example is in the field of reverse engineering of software. Often, software is written in a high-level language such as C, FORTRAN, etc., and then compiled into a machine-level binary representation. In some situations, e.g., checking for patent infringement or analyzing a virus, one would like to reverse this procedure, i.e., obtain source code from the machine code. In order to do this, one would need to know which compiler had been used in the original conversion from high-level source to machine-level binary code, and then use a de-compiler that had been specifically constructed for that particular compiler.

One essential part of this procedure is to determine from the machine code of a program the compiler that was used to generate it. This is feasible because each compiler typically generates machine code in a fairly idiosyncratic way that is in principle distinguishable from that of other compilers. In many situations, humans are able to determine the compiler simply by looking for text strings imbedded in the machine code that identify the compiler. However, if the program's author were deliberately trying to hide illegal or immoral activity such as patent infringement or virus writing, he might intentionally modify or eliminate text strings that indicate the compiler. In this case, determination of the compiler must rely on identification of machine-code features that are specific to that compiler, but not to other compilers. It would be very difficult for a human to be familiar with particular machine-code features that are peculiar to one compiler or another. Thus, there is a need for a method of automatically constructing a classifier capable of determining the compiler that was used to generate a given machine-code representation of a program.

These examples, taken from the fields of generic virus detection and reverse software engineering, are illustrative of the general need for an automatic method for constructing data-string classifiers.

SUMMARY OF THE INVENTION

The present invention is a method of constructing a classifier of data strings. In general, a data string is a sequence of atomic units of data that represent information, such as: digital bits, bytes or characters, in the context of computer data or text; arbitrary representations of nucleotides, amino acids, etc., in the context of DNA or protein sequences; and arbitrary representations of phonemes or triphones in the context of human speech analysis and synthesis.

The method includes providing a labelled set of exemplars from a plurality of classes, defining a set of features, based on the exemplars, that are likely to be relevant to the classification, and developing a classifier, based on the exemplars and the features, which, given a data string as input, produces as output a class label.

In one embodiment of the invention, the likelihood that the features are relevant to the classification is determined statistically, and the development of the classifier includes training the classifier on the exemplars to take as input a function of the occurrence frequency of each of the features, and to produce as output a class label. The method comprises providing a set of data strings, each labelled as belonging to one of two or more classes (one of which may be a "default" class). A list of all features (e.g., byte sequences of specified length, or logical combinations of such byte sequences) which appear in the data strings of non-default classes is formed. The list of features is pruned to include only those which appear frequently in one non-default class and infrequently in all other classes. A small feature set is chosen, comprising features such that, for each non-default class, each member of that class contains at least a number $n_{cover}$ of the features in the small feature set. Next, classifier input and output vectors for each of the data strings are constructed. A classifier is then trained with these vectors. Subsequent to construction of the classifier, it may be used to classify a data string that was not used to construct the classifier. If the class of the new data string is known, it can be compared with the class output by the classifier to test the accuracy of the classifier; if it is not previously known, the class output by the classifier can be taken as a good estimate of the actual class of the new data string.

In another embodiment, the present invention provides a method for constructing a classifier of data strings utilizing, in part, human expertise. One method comprises training a classifier based on the exemplars, using features that have been defined by a human expert, or by some other means. Another method comprises using features that have by statistical means been determined to be likely to be relevant to the classification decision, and development of a classifier by a human expert, or by some other means.

In another embodiment, the present invention provides a method for automatically extracting generic viral features from sets of infected and uninfected programs and automatically constructing a classifier that employs those features to distinguish between infected and uninfected programs. Thus, in its application to computer virus detection, it overcomes the drawbacks associated with generic virus detectors that have been developed purely through human expertise. In this context, or that of classifying programs according to the compiler that generated them, the most appropriate representation for a data string is an arbitrary-length string of byte(s), residing on a computer, that may represent executable code and/or data. Examples of such bit strings include executable programs, data files, text files, and boot records.

In still another embodiment, the present invention provides a method for constructing a machine-code compiler classifier. The method includes providing C sets of programs, $p(1), p(2), \ldots, p(C)$, such that, for any i from 1 to C inclusive, $p(i)$ contains programs known to have been compiled using compiler $c(i)$, and dividing each set of programs $p(i)$ into training and test sets $p_{train}(i)$ and $p_{test}(i)$. For each training program set $p_{train}(i)$, with i running from 1 to C inclusive, form a list of all potential features which appear in program set $P_{train}(i)$. Next, for each training program set $P_{train}(i)$, prune the corresponding list of potential features to include only those which appear with a relative frequency greater than or equal to a specified threshold frequency $T_{common}$ in $p(i)$, and which appear with a relative frequency less than a specified threshold frequency $T_{rare}$ among the all training program sets other than $P_{train}(i)$. Choose, from the list of potential features for each training program set $P_{train}(i)$, a small feature set comprising features such that each program in the set $P_{train}(i)$ contains at least $n_{cover}$ of the features in the small feature set. Next, construct input vectors for the training and testing sets based on the small feature sets, the input training vectors and associated output vectors for each program constituting an overall training-vector set, and the input test vectors and associated output vectors for each program constituting an overall test-vector set. Finally, train a classifier on the training vectors and test its performance on the test vectors.

In the above embodiments, the features may be derived from the data strings, and consist of substrings, substrings with wild cards of limited or unlimited length, or logical combinations of the pattern of occurrence of such substrings in a given input string, possibly including some positional information.

FIGURES

DETAILED DESCRIPTION

Figure 1:
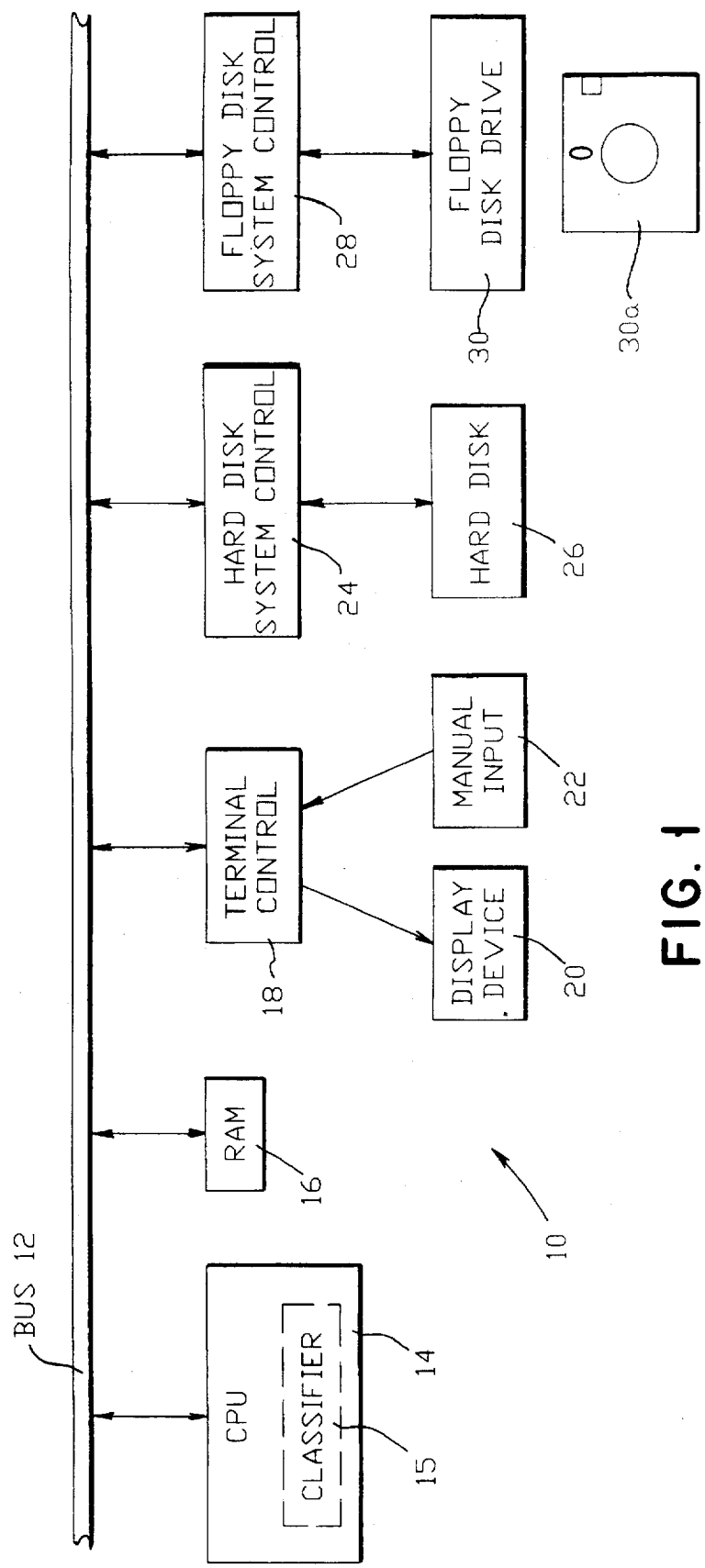
FIG. 1 is a block diagram of the system of the present invention.

FIG. 1 is a block diagram of a system 10 that is suitable for practicing the teaching of the invention. A bus 12 is comprised of a plurality of signal lines for conveying addresses, data, and controls between a Central Processing Unit 14 and a number of other system bus units. A RAM 16 is coupled to the system bus 12 and provides program instruction storage and working memory for the CPU 14. The CPU includes a classifier 15, which can be trained to detect data strings of a particular class. The classifier will be described in more detail below. A terminal control subsystem 18 is coupled to the system bus 14 and provides outputs to a display device 20, typically a CRT monitor, and receives inputs from a manual input device 22, typically a keyboard. Manual input may also be provided from a pointing device, such as a mouse. A hard disk control subsystem 24 bidirectionally couples a rotating fixed disk, or hard disk 26, to the system bus 12. The control 24 and hard disk 26 provide mass storage for CPU instructions and data. A floppy disk control subsystem 28, which along with floppy disk drives 30 is useful as an input means in the transfer of computer files from a floppy diskette 30a to system memory, bidirectionally couples one or more of floppy disk drives 30 to the system bus 12.

The components illustrated in FIG. 1 may be embodied within a personal computer, a portable computer, a workstation, a minicomputer, or a supercomputer. As such, the details of the physical embodiment of the data processing system 10, such as the structure of the bus 12 or the number of CPUs 14 that are coupled to the bus, is not crucial to the operation of the invention, and is not described in further detail below.

Figure 2:
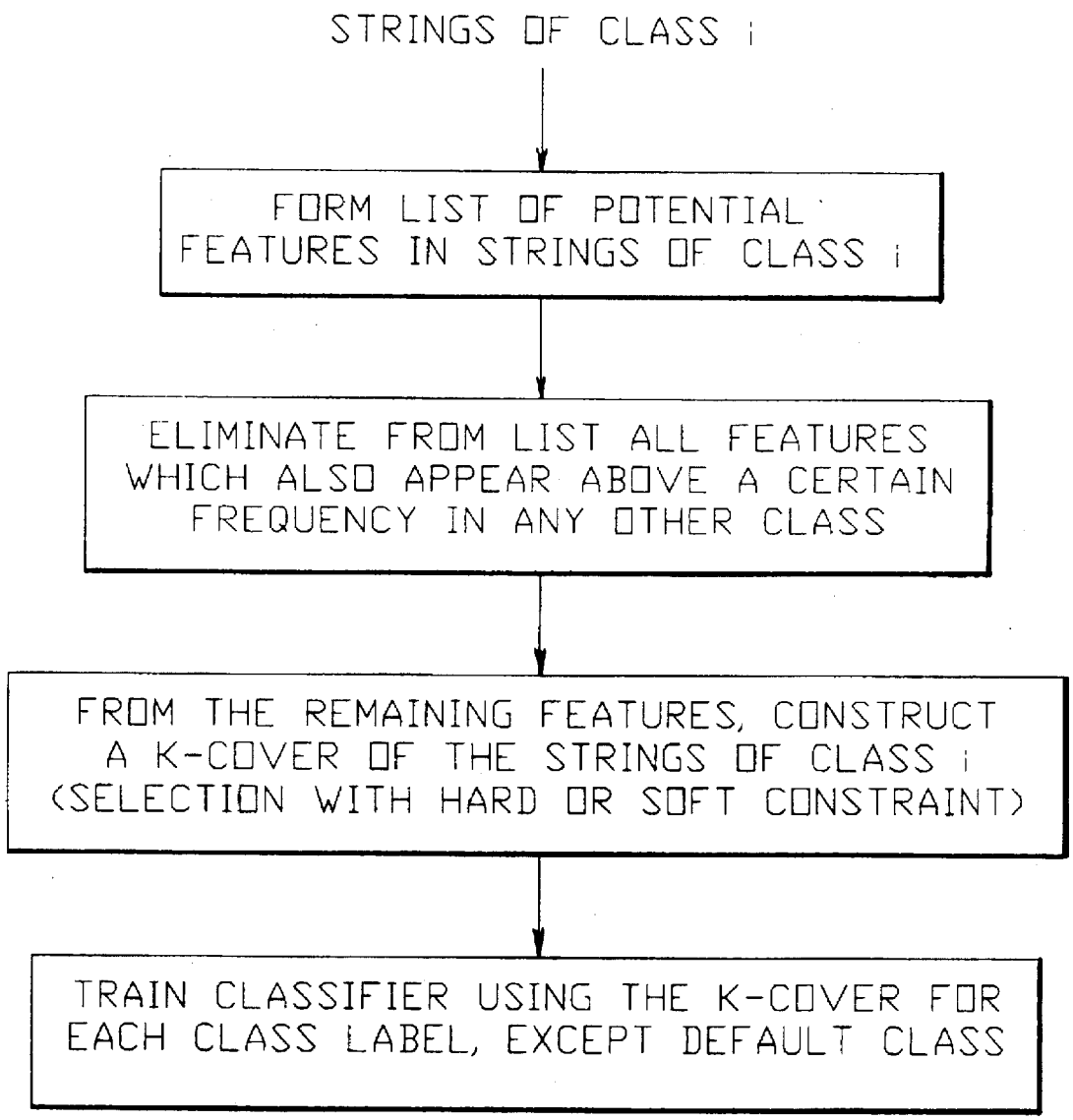
FIG. 2 is a flow diagram describing a method for constructing a classifier of data strings in accordance with the present invention.

The method of the present invention will now be described with reference to FIG. 2. As discussed later herein, the invention is useful as a virus classification and detection method, and as a means for reverse software engineering by determining the compiler that was used to generate a particular program, or for determining the general function of the program, but it will be understood that the technique shown in FIG. 2 and described below can also be used, with trivial changes in nomenclature, for instance, in the fields of:

a) DNA sequence classification, as a means of classifying sequences according to the trait to which they contribute, the protein they code for, the species they occur in, etc.;

b) protein sequence classification;

c) text processing, as a means for determining the language in which a document is written, the general topic, or perhaps the author;

d) speech recognition, as a means for discriminating among various types of speaker (such as female/male, dialects, etc.);

e) handwriting recognition, as a means for discriminating among various styles of handwriting, such as European, Israeli, American, etc;

f) computer program analysis, as a means for determining whether a given program has been compressed using a particular compression algorithm, or for determining roughly the function of the computer program.

Feature Identification

The invention provides an automated, statistical technique for identifying features present in the labeled set of exemplars that are likely to be relevant to the classification decision. The features are derived from the data strings, and consist of substrings, substrings with wildcards of limited or unlimited length, or logical combinations of the pattern of occurrence of such substrings in a given input string, possibly including some positional information. An example of a relatively complicated feature, in the case where the appropriate unit of data is bytes, is: "the occurrence of the substring 'CD 13 EF EB', or the occurrence of both 'BA 80 00' and 'FF ?? 00 FF 00' within 20 bytes of one another" (here ?? denotes a one-byte wildcard which matches any byte).

The procedure for defining the feature set is described below with reference to FIG. 2. The basic idea is to choose substrings which occur with very different frequencies in different classes. The primary elements of the specific procedure we use are the following:

1. For each non-default class i, form a list of all potential features in strings of class i. What constitutes the list of potential features varies from one application to another; in the case of a computer program, a preferred choice is the set of n-grams (i.e., contiguous byte sequences of length n) contained in the machine representation of that program. For this particular task, the preferred values of n are small, in the range of 2–8.

2. From the list of all potential features for class i, eliminate those which appear above a certain frequency in the other classes. In the most general case, define any monotonically non-decreasing multi-variate function of the occurrence frequencies in the other classes; eliminate all features for which the function's value exceeds a defined threshold. In the preferred embodiment, the function is simply the total number of occurrences in all other classes; i.e., a feature is rejected if it occurs too many times among exemplars not contained in class i.

3. From the remaining features, construct a k-cover of the strings of each non-default class i, i.e., a set of features such that every string of class i contains at least k instances of the features in the k-cover. This is a set-covering problem. It is an NP-complete problem for which there are many heuristics, including the "greedy" algorithm.

4. In one embodiment of the invention, the procedure allows for the additional imposition of a hard or soft constraint such that the features in the k-cover of class i have "orthogonal" patterns of occurrences in strings of class i. In other words, strongly correlated features with highly similar occurrence statistics should be treated by eliminating all but one, or by defining a meta-feature that is the conjunction of the correlated features. A Gram-Schmidt orthogonalization procedure could be used for this purpose, as might a singular value decomposition technique.

The Gram-Schmidt orthogonal covering procedure is applied as follows. Associate with each feature a characteristic vector, whose dimension is the number of training exemplars, and where an entry is 1 if the feature occurs for that exemplar, 0 if it does not. The feature possessing the longest characteristic vector is selected (where length is calculated according to some chosen measure, such as Hamming or Euclidean distance), and the remaining characteristic vectors are replaced by their projection orthogonal to the selected vector; this process is repeated until the desired degree of coverage is obtained. (In general, the characteristic vectors' entries can be any function of the number of occurrences of the feature in the exemplar.)

5. The set of input features for the classifier (to be described below) is the union of the k-covers obtained for each of the m classes (except for the default class).

In a typical application, steps 1 and 2 above can produce tens of thousands of qualifying trigrams. For the sake of illustration, however, suppose that we have just 8 trigrams and 10 viruses, and that we wish to construct a 2-cover (step 3). Table 1 shows which viruses contain which trigram.

TABLE 1

| TRIGRAM | VIRUS | | | | | | | | | |
|---|---|---|---|---|---|---|---|---|---|---|
| | 1 | 2 | 3 | 4 | 5 | 6 | 7 | 8 | 9 | 10 |
| $T_1$ | | | | | X | | | X | | X |
| $T_2$ | X | | X | X | X | | | X | X | |
| $T_3$ | | X | X | X | | X | | X | | X |
| $T_4$ | X | | | | X | | | | | |
| $T_5$ | | | | X | | | X | X | | X |
| $T_6$ | X | | | X | X | | X | | X | X |
| $T_7$ | | X | | | | X | X | X | | |
| $T_8$ | X | | | | | X | X | | X | X |
| TOTALS | 4 | 2 | 2 | 4 | 4 | 3 | 4 | 4 | 4 | 5 |

To construct a 2-cover, look for a minimal set of trigrams such that at least two members of the set occur in each virus. Table 2 shows such a 2-cover:

TABLE 2

| TRIGRAM | VIRUS | | | | | | | | | |
|---|---|---|---|---|---|---|---|---|---|---|
| | 1 | 2 | 3 | 4 | 5 | 6 | 7 | 8 | 9 | 10 |
| $T_2$ | X | | | X | X | | | X | X | |
| $T_3$ | | X | X | X | | X | | X | | X |
| $T_6$ | X | | | X | X | | X | | | X |
| $T_7$ | | X | | | | X | X | | X | |
| TOTALS | 2 | 2 | 2 | 3 | 2 | 2 | 2 | 2 | 2 | 2 |

Each virus is represented at least twice in the reduced set of trigrams ($T_2$, $T_3$, $T_6$, $T_7$), so this set constitutes a 2-cover.

Note that a 3-cover is not possible in this example, because the original set of trigrams $T_1$ through $T_8$ only occurs in viruses 2 and 3 twice. However, an incomplete 3-cover could be obtained by enlarging the 2-cover to include trigrams $T_1$ and $T_8$, as shown in Table 3:

TABLE 3

| TRIGRAM | VIRUS | | | | | | | | | |
|---|---|---|---|---|---|---|---|---|---|---|
| | 1 | 2 | 3 | 4 | 5 | 6 | 7 | 8 | 9 | 10 |
| $T_1$ | | | | | X | | | X | | X |
| $T_2$ | X | | X | X | X | | | X | X | |
| $T_3$ | | X | X | X | | X | | X | | X |
| $T_6$ | X | | | X | X | | X | | | X |
| $T_7$ | | X | | | | X | X | | X | |
| $T_8$ | X | | | | | X | X | | X | X |
| TOTALS | 3 | 2 | 2 | 3 | 3 | 3 | 3 | 3 | 3 | 4 |

This incomplete 3-cover would still be potentially useful as a set of features to use as input to a classifier. In other words, a k-cover could still be accepted in step 3, even if it is not complete.

Training the Classifier

The invention provides an automated technique for developing a classifier based on a set of (string,class-label) pairs. This is in contrast to the prior technique in which a human knowledge engineer explicitly designs the classifier based on domain knowledge of the types of strings being examined.

The resulting classifier will not only correctly classify the strings in the example set, but will also, with high accuracy and high confidence, correctly classify novel strings not contained in the example set. As an example, the technique can be applied to the task of distinguishing executable data that are infected by computer viruses from uninfected executable data.

The classifier is developed using "adaptive" or "learning" techniques from the domain of statistical regression and classification. Examples of such techniques include nearest-neighbor classifiers, decision trees, and multi-layer neural networks. The preferred embodiment of the present invention employs a neural network for classification, but it will be understood that other classifiers can be used without departing from the spirit of the invention.

Figure 3:
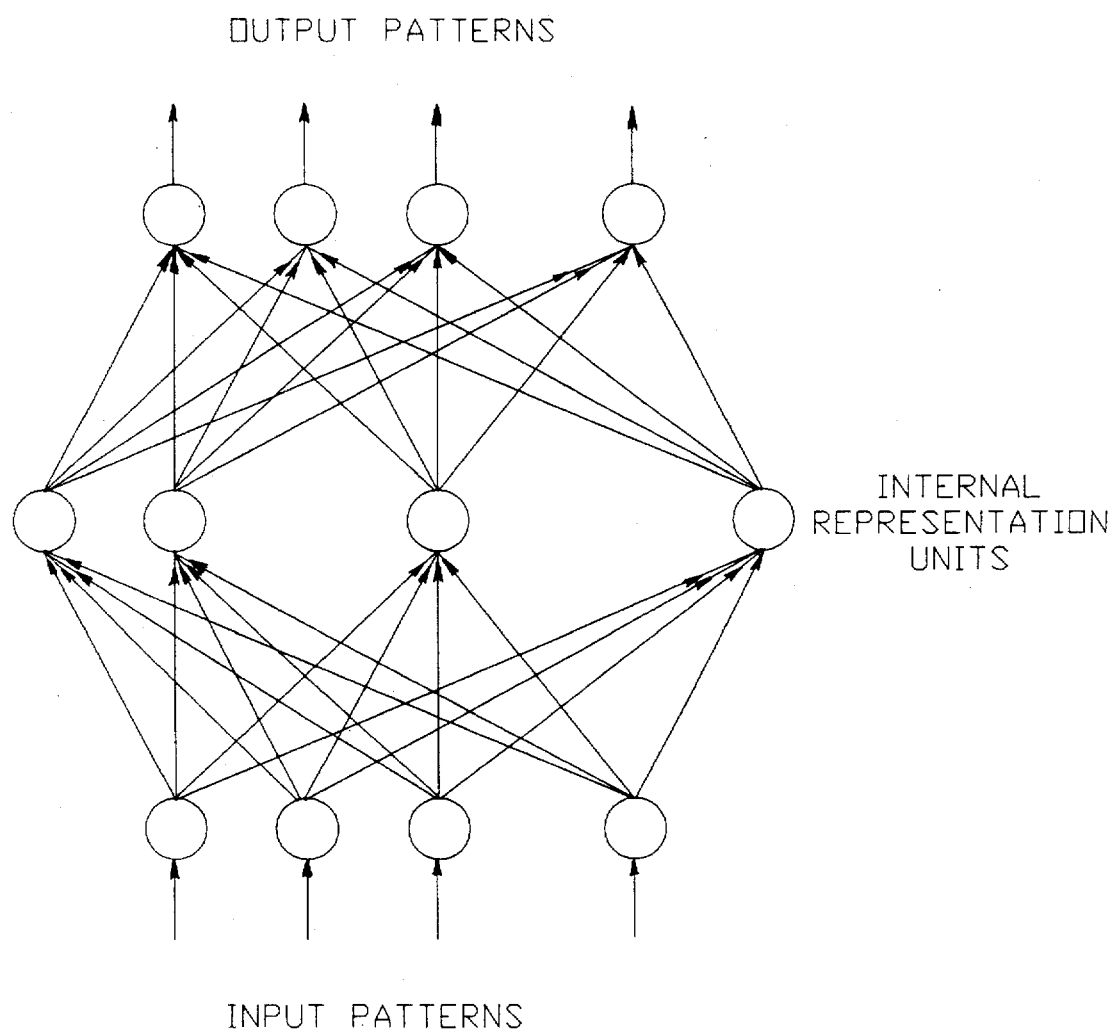
FIG. 3 is a preferred classifier for use with the present invention.

An illustration of a neural network organized in a standard multi-layer perception (MLP) architecture is shown in FIG. 3. The MLP architecture, commonly used in the widely-known backprogagation algorithm for supervised training, may be conveniently thought of as a generic nonlinear function approximator. Its output is computed by a feed-forward flow of activation from the input nodes to the output nodes, passing through one or more layers of internal nodes called "hidden" nodes. Each of the connections in the network is parameterized by a real-valued "weight." Each of the nodes in the network outputs a real number equal to a weighted linear sum of inputs feeding into it, followed by a nonlinear sigmoidal "squashing" operation that maps the total summed input into the unit interval. The nonlinearity of the squashing function enables the neural network to compute nonlinear functions of its input, and the precise function implemented depends on the values of the weights. The operation of neural networks is well known in the art, and will not be described further herein.

A straightforward application of prior techniques would give the raw data strings as input to the classifier. Such an approach suffers from a number of problems that make it unlikely to work, such as the difficulty of generalizing correctly to strings not seen in training, and the non-fixed, arbitrary length of the strings.

In contrast, this invention uses a novel method to provide inputs to the classifier. The classifier analyzes the input string in terms of a set of "features" that are developed using the above described automated procedure, or are supplied by a human expert. The feature set is a set of statistically predictive substrings that are likely to be relevant to the classification decision. Input to the classifier consists of integer counts of the number of occurrences of each substring, or some function of the integer counts (e.g., the binary function indicating presence or absence of the substring).

Once the feature set is obtained, training of the classifier on the labeled exemplars takes place according to standard techniques. For example, a neural classifier network would be trained using a standard learning algorithm, such as back propagation, that adjusts the weights of the network so as to minimize the total classification error on the set of exemplars.

An additional novel aspect of the method of the present invention is a procedure for augmenting the set of default exemplars in the data set. This is appropriate, for example, in binary (0,1) classification tasks in which a specialized set of criteria have to be met for the string to be of class 1, otherwise, by default the string is of class 0. More generally, in an m-class task, the procedure generates additional exemplars of the default class. Two methods may be used for generating such default exemplars. One is to draw the strings from a naturally occurring set of strings that is exceedingly unlikely to match the criteria for belonging to a non-default class. It is desirable, but not strictly necessary, that the distribution that generates the auxiliary set of strings be close in nature to that which generates the true "default" exemplars. A second, less preferred, method is to use artificially generated random or deterministic strings rather than naturally occurring ones. Such an augmented data set might be used either in the definition of the input feature set, or in training the classifier, or both. If auxiliary exemplars are used in defining the input feature set, the frequency thresholds of step 2 in FIG. 2 may be different for the augmented default exemplars than for the real default exemplars. If the auxiliary exemplars are used solely to train the classifier, they could be represented either as data strings or in the same format as the standard input to the classifier, i.e. (possibly fictitious) integer counts of each feature. An example of a deterministic set of auxiliary exemplars presented to the classifier in the latter format is the "identity matrix" set, consisting of f exemplars (where f is the number of features): the $i^{th}$ member has an integer count of zero for each feature, except for an integer count of 1 for the $i^{th}$ feature.

The invention has been successfully used in a virus detector which analyzes the "bootstrap" code (the code that is initially loaded into memory when the computer is re-started) on floppy disks or hard drives (the "boot sector", typically 512 bytes of data on PC's), and which produces with high accuracy a binary output indicating whether or not the boot sector is infected by a computer virus.

Operation of Virus Detection System

Figure 4:
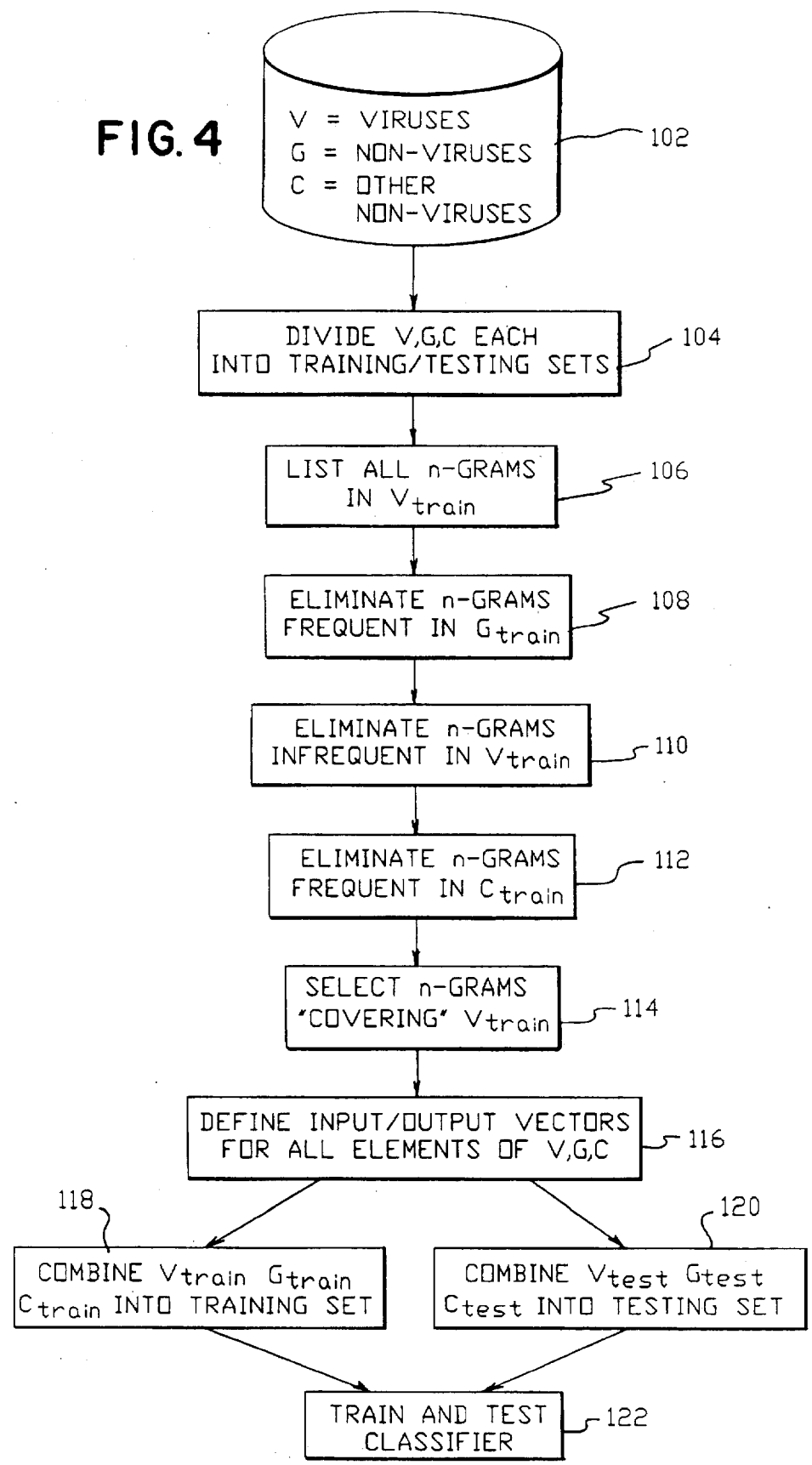
FIG. 4 is a flow diagram describing a method for developing a classifier capable of detecting computer viruses in accordance with the present invention.

Referring now to FIG. 4, the following is a description of a preferred embodiment of the present invention, applied to the particular case of binary classification of boot sectors into either a default "uninfected" class or the "infected" class. The description also discusses possible variations in the preferred method.

1. Start with a set of boot sectors G that are known to be non-viral, a set of boot sectors V that are known to be viral, and (optionally) a corpus C of executable programs that are known to be non-viral. FIG. 4, step 102.

2. Using randomized (or, optionally, deterministic) selection criteria, divide G into "training" and "test" sets $G_{train}$ and $G_{test}$. Likewise, segregate V and C into training and test sets $V_{train}$, $V_{test}$, $C_{train}$ and $C_{test}$. FIG. 4, step 104.

3. Form a list of all byte sequences (n-grams) ranging from $n_{min}$ to $n_{max}$ bytes in length which appear in $V_{train}$. (In a preferred embodiment, $n_{min}=n_{max}=3$; in other words, only trigrams are used.) FIG. 4, step 106.

4. Prune the list of byte sequences to include only those which appear less than or equal to a specified threshold number of times in $G_{train}$. (In a preferred embodiment, the threshold is zero; thus, only trigrams that appear one or more times in $V_{train}$ and never appear in $G_{train}$ are included in the list.) FIG. 4, step 108.

5. Prune the list to include only those byte sequences which appear at least a specified threshold number of times in $V_{train}$. (In a preferred embodiment, the threshold is 20.) FIG. 4, step 110.

6. Prune the list to include only those byte sequences which appear in $C_{train}$ with a relative frequency less than some specified threshold. (In a preferred embodiment, this threshold was 1/200000.) FIG. 4, step 112.

The foregoing steps have generated a long list (possibly thousands or tens of thousands) of byte sequences which are frequently found in viral boot sectors, but infrequently or not at all in legitimate boot sectors, and which are also relatively rare in code found in executable files. Such a large number of features cannot be handled practically by neural nets and other classifiers, as it would typically cause the number of adjustable parameters in the classifier to exceed the number of training exemplars, resulting in the well-known phenomenon of "overfitting" to the training data and thereby producing poor generalization performance.

7. In step 114 of FIG. 4, an additional selection criterion is applied. The goal is to select a small set of features that, individually, or perhaps in combination with others, are highly indicative of viruses. In a preferred embodiment, this is done by choosing a small "feature" set consisting of byte sequences such that each member of the viral set $V_{train}$ contains at least $n_{cover}$ of the byte sequences in the feature set. Another way to state this is that the list of byte sequences is used to perform an $n_{cover}$-cover of $V_{train}$, and the byte sequences used in the cover are taken to be the "feature" set. In a preferred embodiment, $n_{cover}$ is chosen to be 4. This procedure can be expected to generate a feature set containing a few dozen features.

8. In step 116 of FIG. 4, input vectors for training and testing are constructed. Consider a boot record, executable file, or in fact any string of bytes, and call that entity F. Then the $i^{th}$ component of the input vector pertaining to F, $I_F$, is simply the number of times (or, alternatively, some function of the number of times) that the $i^{th}$ feature appears in F. Thus, the dimension of $I_F$ is the number of features in the feature set. The output vector $O_F$ is a classification of F. In the simplest case, the classification might simply be "viral" (which could be represented as a "1") or "non-viral" (which could be represented as a "0"). The output vector $O_F$ would simply be one-dimensional in that case. Finer distinctions into various categories of virus, e.g., whether F is classified as belonging to the Stoned virus family) could be contemplated as well; the dimension of the output vector would be equal to the number of virus classes in such a case.

Input and output vectors would be computed for each member of the training sets $V_{train}$ and $G_{train}$ and the test sets $V_{test}$ and $G_{test}$. Under certain conditions, an additional set of training and test vectors might be helpful or even necessary. For example, in a preferred implementation, step 108 of FIG. 4 prevents any trigram that appears in $G_{train}$ from appearing in the feature set. As a result, all of the input vectors for the non-viral training set contain all zeroes. In such a situation, the classifier could obtain the best possible classification performance on the training set simply by classifying any data string containing one or more "viral" features as "viral". However, this method of classification is extremely vulnerable to false positives—it is quite conceivable that, in a collection of new, legitimate data strings presented to the classifier, one of the trigram features will by happenstance be present, causing the data string to be falsely labeled as a virus. Nearly always, it is possible to draw a boundary between viral and non-viral classes that allows input vectors with some small number of non-zero components to be classified as non-viruses, and still permits the best (or nearly the best) possible classification performance on the training set. One way to help the classifier determine where to draw this boundary is to introduce input vectors with a small number of non-zero components that are classified as non-viral. This requires an auxiliary set of data. To achieve this, a large number of "pseudo" non-viral boot sectors can be generated by selecting 512-byte segments of executable files in the corpus of training and test sets $C_{train}$ and $C_{test}$. The segments could be selected from some standard part of the file, such as the beginning, end, or entry point, or could be chosen at random. In a preferred embodiment, the 512-byte segment starting at the apparent entry point is taken as a surrogate boot record. Due to the fact that only relatively infrequently appearing trigrams are qualified to be selected as viral features, the vast majority of pseudo boot sectors have an input vector consisting of all zeroes. If desired, any such all-zero input vectors can be discarded. In practice, however, with $C_{train}$ and $C_{test}$ containing several thousand files apiece, at least several dozen non-zero input vectors are generated, and can be made to serve as surrogate examples of non-viruses that contain some "viral" features.

9. The viral, legitimate, and (possibly) pseudo-legitimate input training vectors, along with their associated output vectors, form an overall training-vector set. FIG. 4, step 118. The viral and legitimate input test vectors and their associated outputs form a "real" test-vector set, and the pseudo-legitimate input test vectors and their associated output vectors constitute a "pseudo" test-vector set. In a preferred embodiment, the $V_{test}$, $G_{test}$ and $C_{test}$ input and output vectors are combined to form a testing set. FIG. 4, step 120.

10. A neural net or other classifier is trained on the training vectors, according to standard methods for minimizing classification error on the training set. Also in accordance with standard methodology, the classifier is applied to the test vectors to estimate the classifier's generalization performance.

The method of the present invention can be incorporated into an anti-virus program as a component for the generic detection of boot sector viruses. Similar techniques could be used to derive a generic file-infector detector.

Operation of a Compiler Detection System

Figure 5:
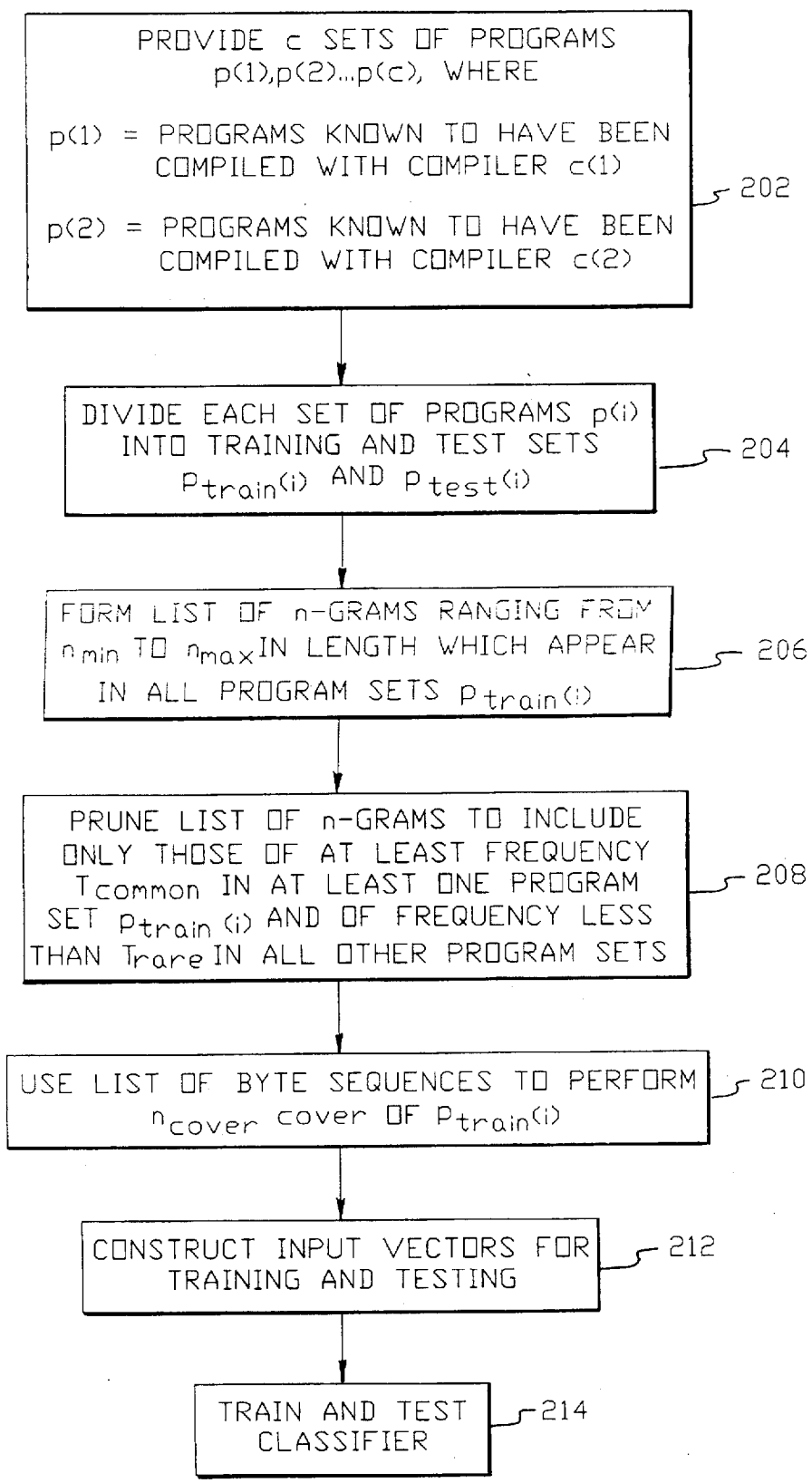
FIG. 5 is a flow diagram describing a method for developing a classifier capable of determining the compiler used to generate a given machine-code representation of a computer program in accordance with the present invention.

Referring now to FIG. 5, the following is a description of a preferred embodiment of the present invention, applied to the particular case of classification of machine-code representations of programs as having been generated by one of a set of compilers, or else none of the known compilers.

1. Start with a set of programs p(1) known to have been compiled using compiler c(1), a set of programs p(2)

known to have been compiled using compiler c(2), etc., the total number of different compilers being C. Optionally, one might also supply a set of programs p(0) known to have been generated by compilers not included among the C compilers, or known to have been generated without use of a compiler (e.g. directly in assembler). FIG. 5, step 202.

2. Using randomized, (or, optionally, deterministic) selection criteria, divide each set of programs p(i) (where i runs from 0 to C) into "training" and "test" sets $P_{train}(i)$ and $P_{test}(i)$. FIG. 5, step 204.

3. Form a list of all byte sequences (n-grams) ranging from $n_{min}$ to $m_{max}$ bytes in length which appear in all program sets $P_{train}(i)$, where i runs from 1 to C. In a preferred embodiment, $n_{min}=n_{max}=3$. FIG. 5, step 206.

4. Prune the list of byte sequences to include only those which appear with a relative frequency greater than or equal to a specified threshold frequency $T_{common}$ in at least one program set $P_{train}(i)$, and which appear with a relative frequency less than a lower specified threshold frequency $T_{rare}$ among the programs contained in all program training sets other than $P_{train}(i)$. FIG. 5, step 208.

5. For each set $P_{train}(i)$, with i running from 1 to C, choose a small feature set consisting of byte sequences from the list produced in step 4, such that each member of $P_{train}(i)$ contains at least $n_{cover}$ of the byte sequences in the feature set. Another way to state this is that the list of byte sequences is used to perform an $n_{cover}$-cover of $P_{train}(i)$, and the byte sequences used in the cover are taken to be the "feature" set. FIG. 5, step 210.

6. Construct input vectors for training and testing as follows. Consider a particular program P that is a member of $P_{train}(i)$ or $P_{test}(i)$, where i can be from 0 to C inclusive. Then the $j^{th}$ component of the input vector $I_P$ representing P is the number of times (or, alternatively, some function of the number of times) that the $j^{th}$ feature appears in P. The output vector for P, $O^P$, is of dimension C, and contains a "1" in the $i^{th}$ component and a "0" in all other components. (Note that, if i=0, P belongs to the default class, and the output vector contains all zeroes.). FIG. 5, step 212.

7. The input training vectors and associated output vectors for each program in $P_{train}(i)$, with i running from 0 to C, constitute an overall training-vector set. The input test vectors and associated output vectors for each program in $P_{test}(i)$, with i running from 0 to C, constitute an overall test-vector set.

8. A neural network or other classifier is trained on the training vectors, according to standard methods for minimizing classification error on the training set. Also in accordance with standard methodology, the classifier is applied to the test vectors to estimate the classifier's generalization performance. FIG. 5, line 214.

EXAMPLE

Now presented is a description of one particular example employing the method of the present invention in the area of virus classification. 65 legitimate boot sectors were randomly segregated; 45 were included in the training set and the remaining 20 in the test set. Similarly, 169 viral boot sectors were randomly split into 105 in the training set and 64 in the test set, and a corpus of 10,347 executable files was split into 5,182 in the training set and 5,165 in the test set. 25,894 trigrams satisfied the criterion of appearing one or more times in $V_{train}$ and zero times in $G_{train}$. Of these, 23,698 appeared with a relative frequency of less than $1/200000$ in $C_{train}$. Using this set of trigrams to perfrom a 4-cover of $V_{train}$, 51 trigrams were obtained, and considered to be "viral" features. Input vectors based on counts of the 51 trigram features were computed for $V_{train}$, $G_{train}$, and $C_{train}$. After removing from the latter set all vectors that were zero in each component, 97 pseudo-legitimate input vectors remained.

The combined training set made up of 105 viral, 45 legitimate, and 97 pseudo-legitimate input-output vectors (a total of 247 patterns) was used to train a neural network. Similarly, the test set made up of 64 viral and 20 non-viral legitimate input-output vectors (a total of 84 patterns) was used to estimate generalization performance. A standard single-layer feed-forward neural network with 51 input units and one sigmoidal output unit was trained on the training patterns using the backpropagation learning procedure. The target output value was 1 if the pattern was viral and 0 if the pattern was legitimate or pseudo-legitimate. To interpret the neural network's output as a class label, a threshold value of 0.5 was used, so that any pattern with an output value greater than 0.5 was classified as viral, while output values below 0.5 were classified as non-viral. With this definition, the neural network achieved a classification accuracy of 100% on the training set and 93% on the test set. The test set errors occurred on viral patterns only: all 20 non-viral test patterns were correctly classified, while 58 of the 64 viral test patterns were correctly classified.

While the invention has been particularly shown and described with respect to preferred embodiments thereof, it will be understood by those skilled in the art that changes in form and details may be made therein without departing from the scope and spirit of the invention.

We claim:

1. A method of constructing a classifier of data strings, comprising:

defining a set of classes, wherein one of the classes is a default class;

providing a labelled set of exemplars from a plurality of the classes;

defining a set of features, based on the examplars, that are statistically likely to be relevant to the classification;

developing a classifier that uses the occurrence frequency of the features in an input string to classify that string, augmenting the number of exemplars in the default class with additional exemplars chosen from outside the plurality of classes.

2. The method of claim 1, wherein developing the classifier comprises training the classifier on the exemplars to take as input a transformed function of the occurrence frequency of each of the features in a given data string, and to produce as output a class label.

3. The method of claim 2, wherein the transformed function of the occurrence frequency of each feature is zero if the occurrence frequency is zero, and one otherwise.

4. The method of claim 1, wherein the features are contiguous data sequences possessing lengths within a specified range.

5. The method of claim 1, wherein each of the features is common in one class and uncommon in other classes.

6. The method of claim 1, wherein the additional exemplars resemble the default exemplars.

7. A method of constructing a classifier of data strings, comprising:

providing a labelled set of exemplars from a plurality of classes;

augmenting the number of exemplars in the default class with additional exemplars chosen from outside the plurality of classes, wherein the additional exemplars resemble the default exemplars;

defining a set of features, based on the exemplars, that are statistically likely to be relevant to the classification, the features being contiguous data sequences possessing lengths within a specified range, and which are common in one class and uncommon in other classes, wherein defining a set of features comprises:

for each class:

forming a minimal list of all features which appear among the exemplars of that class with a relative frequency greater than a specified threshold; and eliminating from the list every feature for which the value of a specified monotonically non-decreasing multi-variate function of the relative frequencies of that feature within each of the other classes is greater than a specified threshold;

selecting from the remaining features in the list for each class a set of one or more features such that each exemplar in the class contains at least a number $n_{cover}$ of the features in the set;

selecting from the remaining features in the list for each class a set of one or more features having orthogonal patterns of occurrence among the exemplars of that class, such that each exemplar in that class contains at least $n_{cover}$ of the features in the set;

developing a classifier that uses the occurrence frequency of the features in an input string to classify that string, wherein developing the classifier comprises training the classifier on the exemplars to take as input a function of the occurrence frequency of each of the features, and to produce as output a class label.

8. A method of constructing a classifier of data strings, comprising:

providing a labelled set of exemplars from a plurality of classes;

defining a set of features, based on the exemplars, that are statistically likely to be relevant to the classification, comprising:

for each class:

forming a list of each feature for which the average of a transformed frequency, defined as a specified transforming function of the occurrence frequency of that feature, among the exemplars of that class exceeds a predetermined threshold;

eliminating from the list every feature for which the value of a specified monotonically non-decreasing multi-variate function of the average of the transformed frequency of that feature in each of the other classes exceeds a predetermined threshold;

developing a classifier that uses the occurrence frequency of the features in an input string to classify that string, wherein developing the classifier comprises training the classifier on the exemplars to take as input a function of the occurrence frequency of each of the features, and to produce as output a class label.

9. The method of claim 8, wherein the monotonically non-decreasing multi-variate function is the occurrence frequency of the given feature among all exemplars except those in the given class, divided by the total number of units of data contained in those exemplars.

10. The method of claim 8, wherein the monotonically non-decreasing multi-variate function is the number of exemplars not in the given class that contain one or more instances of the given feature, divided by the total number of exemplars not in the given class.

11. The method of claim 8, further comprising:

selecting from the remaining features in the list a cover comprising a set of one or more features such that each exemplar in the class contains at least a number $n_{cover}$ of the features in that class.

12. The method of claim 11, wherein the number of features in the list for each class is minimal, or nearly minimal.

13. The method of claim 8, further comprising:

selecting from the remaining features in the list an incomplete cover comprising a set of one or more features such that the number of exemplars in the class containing at least a number $n_{cover}$ of the features in the set exceeds a specified threshold.

14. The method of claim 8, further comprising:

selecting features from the remaining features in the list for each class such that the selected features have maximally orthogonal patterns of occurrence among the exemplars of that class.

15. The method of claim 14, wherein the orthogonal patterns of occurrence are determined using a Gram-Schmidt orthogonalization procedure.

* * * * *